United States Patent [19]
Sasaki

[11] Patent Number: 5,911,768
[45] Date of Patent: Jun. 15, 1999

[54] AUTOMOTIVE VEHICLE SUSPENSION CONTROL APPARATUS

[75] Inventor: Mitsuo Sasaki, Atsugi, Japan

[73] Assignee: Unisia Jecs Corporation, Atsugi, Japan

[21] Appl. No.: 08/735,076

[22] Filed: Oct. 18, 1996

[30] Foreign Application Priority Data

Oct. 20, 1995 [JP] Japan ................................. 7-272979

[51] Int. Cl.$^6$ ................................................. B60G 17/00
[52] U.S. Cl. ............................... 701/38; 701/37; 701/48
[58] Field of Search ............................... 701/37, 48, 38; 280/5.5, 5.512; 180/197

[56] References Cited

U.S. PATENT DOCUMENTS

| | | | |
|---|---|---|---|
| 4,852,903 | 8/1989 | Tanaka et al. | 280/689 |
| 5,013,062 | 5/1991 | Yonekawa et al. | 280/707 |
| 5,092,624 | 3/1992 | Fukuyama et al. | 280/707 |
| 5,199,737 | 4/1993 | Huang | 280/707 |
| 5,377,107 | 12/1994 | Shimizu et al. | 364/424.05 |
| 5,432,700 | 7/1995 | Hrovat et al. | 364/424 |
| 5,638,275 | 6/1997 | Sasaki et al. | 701/38 |

FOREIGN PATENT DOCUMENTS

| | | |
|---|---|---|
| 0 162 449 | 11/1985 | European Pat. Off. . |
| 0 237 919 | 9/1987 | European Pat. Off. . |
| 0 424 904 | 5/1991 | European Pat. Off. . |
| 0 499 790 | 8/1992 | European Pat. Off. . |
| 0 659 598 | 6/1995 | European Pat. Off. . |
| 41 03 188 | 4/1992 | Germany . |
| 41 39 692 | 6/1992 | Germany . |
| 43 23 544 | 1/1994 | Germany . |

OTHER PUBLICATIONS

"Patent Abstract of Japan" 63 212112 (Sep. 1988).
"Patent Abstract of Japan" 06 048147 (Feb. 1994).

*Primary Examiner*—William A. Cuchlinski, Jr.
*Assistant Examiner*—Arthur Donnelly
*Attorney, Agent, or Firm*—Foley & Lardner

[57] ABSTRACT

A suspension control apparatus for use with shock absorbers provided between sprung and unsprung masses of the vehicle at the respective road wheel positions for providing variable damping force characteristics. A control unit receives first sensor signals indicative of sensed vehicle sprung mass vertical behaviors for controlling the shock absorbers to have respective target damping force characteristics determined based on the vehicle sprung mass vertical behaviors. A surface condition of a road on which the vehicle is running is determined based on the first sensor signals. The control unit also receives a second sensor signal indicative of a sensed vehicle lateral acceleration for detecting vehicle steering operation. The second sensor signal is compared with a reference value. Vehicle steering operation is detected in response to a result of comparison of the second sensor signal with the reference value. The target damping force characteristics for vehicle steering operation are determined upon the detection of the vehicle steering operation. The reference value is corrected based on the determined surface condition.

8 Claims, 16 Drawing Sheets

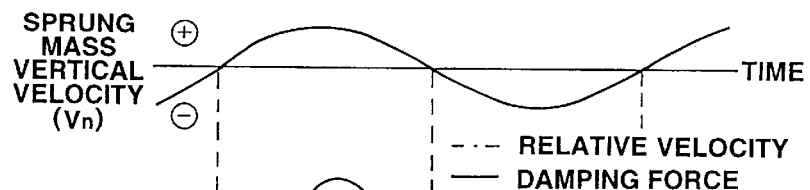
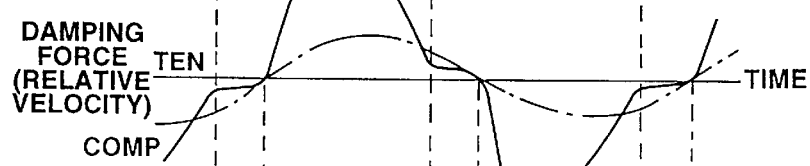
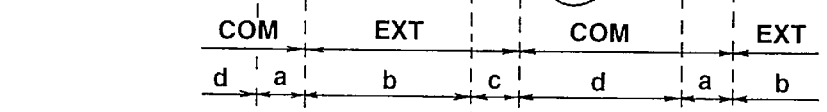
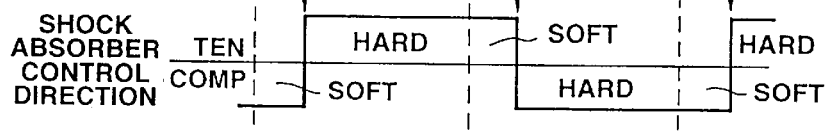
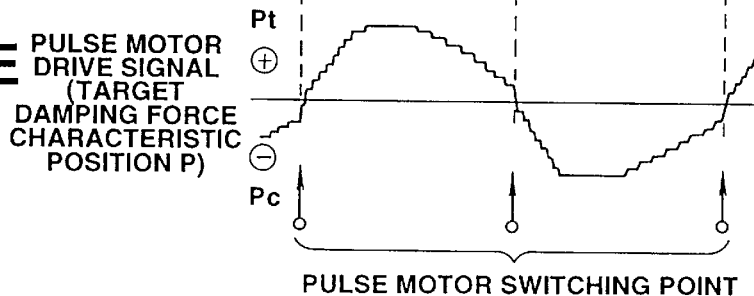

AUTOMOTIVE VEHICLE SUSPENSION CONTROL APPARATUS

BACKGROUND OF THE INVENTION

This invention relates to a suspension control apparatus for use with an automotive vehicle supported on front and rear pairs of road wheels to control the damping force characteristic of each of the shock absorbers interposed between a sprung mass (vehicle body) and an unsprung mass (corresponding one of the road wheels).

For example, Japanese Patent Kokai No. 2-237809 discloses an automotive vehicle suspension control apparatus for controlling the damping force characteristics of the respective shock absorbers provided on an automotive vehicle. The conventional suspension control apparatus employs a lateral G sensor for producing a sensor signal indicative of a sensed vehicle lateral acceleration. The sensor signal is converted into a signal indicative of the rate of change of the vehicle lateral acceleration. The conventional suspension control apparatus is arranged to reduce the influence of the lateral acceleration on the vehicle driving feeling by controlling the shock absorbers to have increased damping forces when the converted signal has the same phase as the sensor signal and to have decreased damping forces when the converted signal has a phase opposite to that of the sensor signal. Since the damping forces are controlled based on the sensor signal in the same manner when the vehicle rolls due to disturbances such as road surface inputs produced when the vehicle is running in a straight line as controlled when the vehicle rolls due to vehicle steering operation, however. It is very difficult to ensure both of vehicle steering stability and comfortable vehicle driving feeling,

SUMMARY OF THE INVENTION

It is a main object of the intention to provide an improved vehicle suspension control system which can ensure comfortable vehicle driving feeling when the vehicle is running in a straight line on a good road surface, ensure good vehicle steering stability when the vehicle is turning and retain good vehicle driving feeling when the vehicle is running in a straight line on a bad surface road.

There is provided, in accordance with the invention, a suspension control apparatus for use with an automotive vehicle supported on front-left and -right road wheels at front-left and -right road wheel positions and also on rear-left and -right road wheels at rear-left and -right road wheel positions. The suspension control apparatus comprises shock absorbers provided between sprung and unsprung masses of the vehicle at the respective road wheel positions for providing variable damping force characteristics, first sensor means sensitive to vehicle sprung mass vertical behaviors for producing first sensor signals indicative of the sensed vehicle sprung mass vertical behaviors, second sensor means sensitive to a vehicle lateral acceleration for producing a second sensor signal indicative of the sensed vehicle lateral acceleration, and a control unit responsive to the first sensor signals for controlling the shock absorbers to have respective target damping force characteristics. The control unit includes means for determining the target damping force characteristics based on the sensed vehicle sprung mass vertical behaviors, means for determining a surface condition of a road on which the vehicle is running based on the first sensor signals, means for comparing the second sensor signal with a reference value, means For detecting vehicle steering operation in response to a result of comparison of the second sensor signal with the reference value, means for determining the target damping force characteristics for vehicle steering operation upon the detection of the vehicle steering operation, and means for correcting the reference value based on the determined surface condition.

BRIEF DESCRIPTION OF THE DRAWINGS

The invention will be described in greater detail by reference to the following description taken in connection with the accompanying drawings, in which:

FIGS. 15A–15E are time charts used in explaining the operation of the control unit to control the damping force characteristics of the sock absorbers;

DETAILED DESCRIPTION OF THE INVENTION

Figure 1:
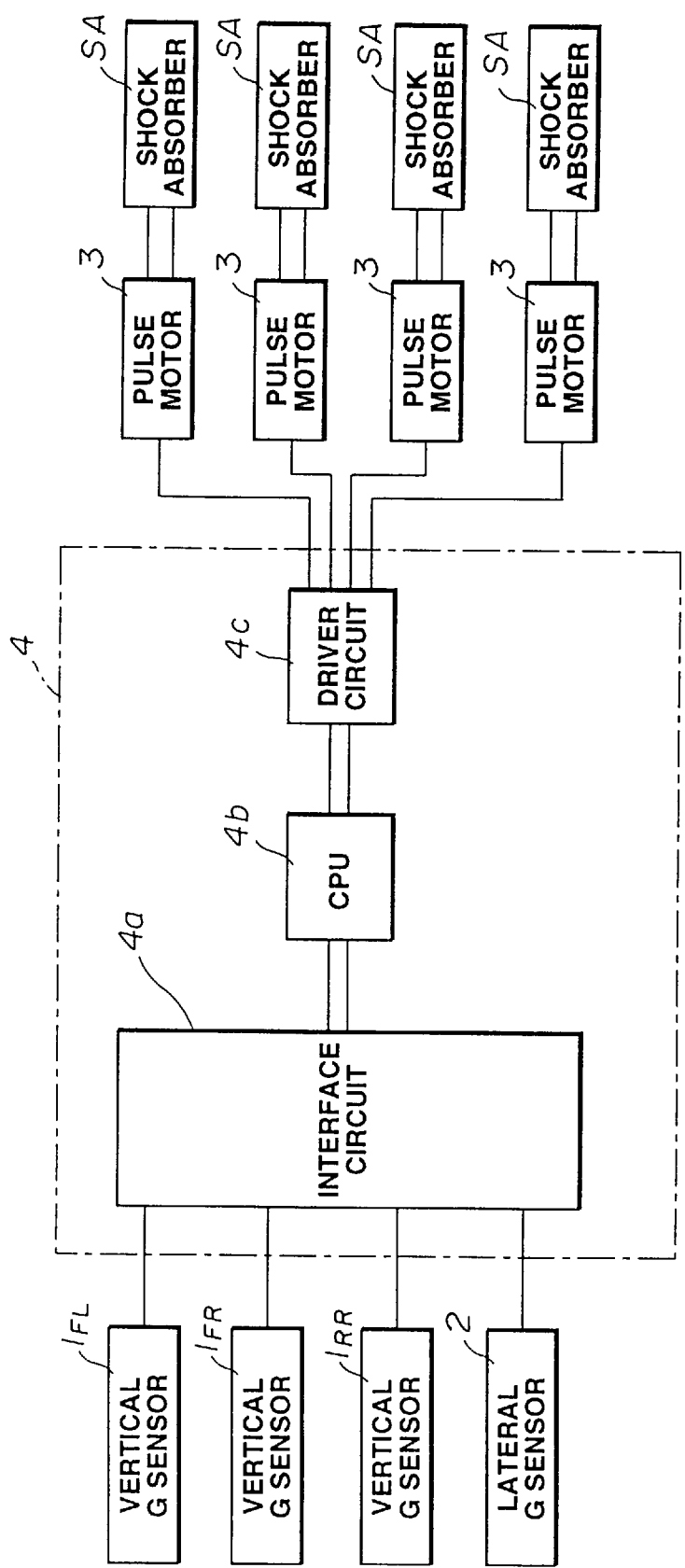
FIG. 1 is a schematic diagram showing one embodiment of an automotive vehicle suspension control apparatus made in accordance with the invention.
Figure 2:
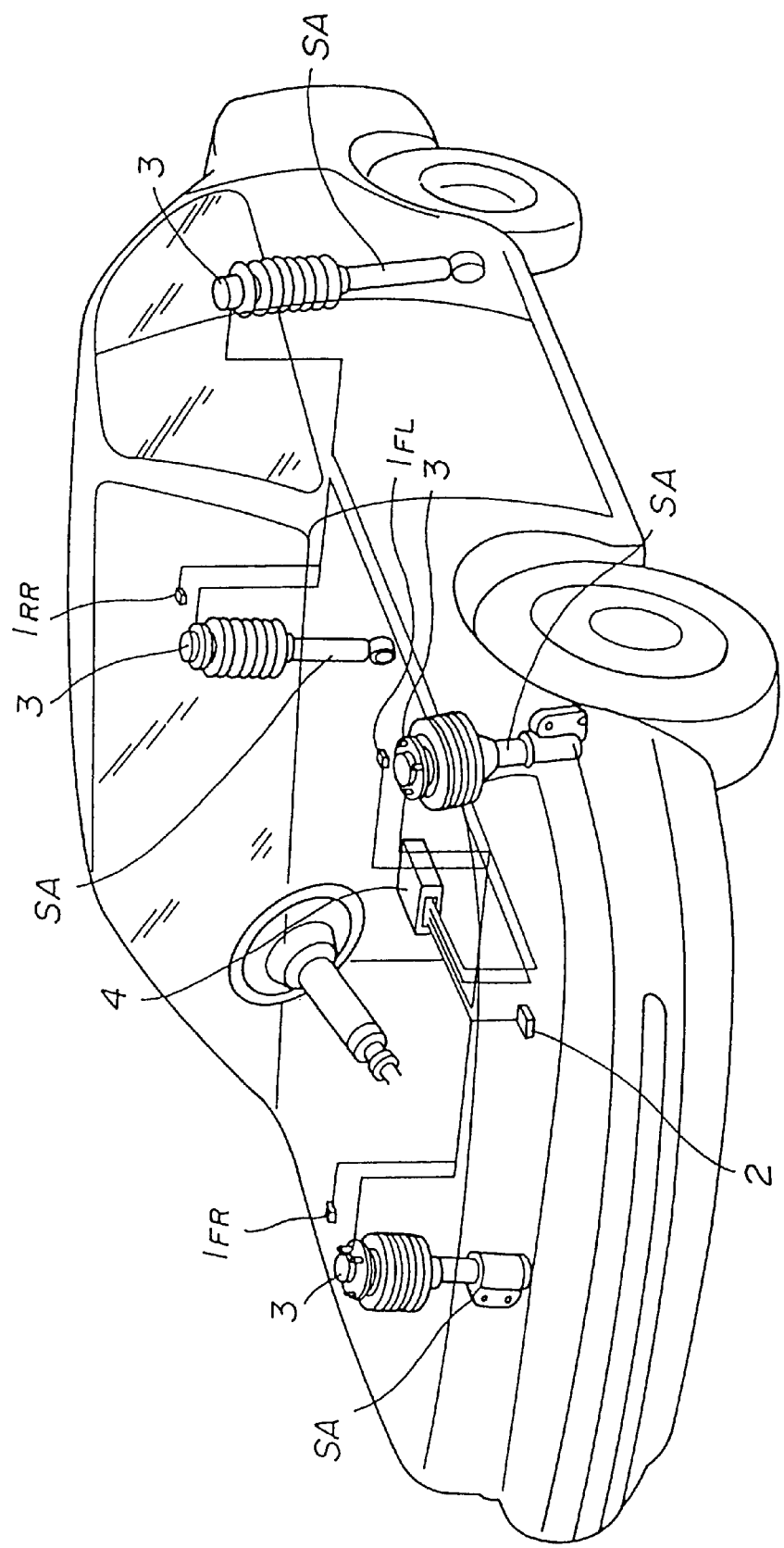
FIG. 2 is a perspective view showing shock absorbers used with the automotive vehicle.

With reference to the drawings, and in particular to FIG. 1, there is shown a schematic diagram of an automotive vehicle suspension control apparatus embodying the invention. The suspension control apparatus is shown as including a control unit 4 for driving pulse motors 3 in a manner to provide optimum damping force characteristics for shock absorbers SA. As best shown in FIG. 2, each of the four shock absorbers $SA_{FL}$, $SA_{FR}$, $SA_{RL}$ and $SA_{RR}$ is interposed between a sprung mass (vehicle body) and an unsprung mass (tire wheel). The control unit 4, which is mounted near the driver's seat (FIG. 2), includes an interface circuit 4a, a central processing unit (CPU) 4b, and a drive circuit 4c. The central processing unit 4b calculates desired damping force characteristics (in the form of damping coefficients) to be provided for the respective shock absorbers SA. These calculations are made based on signals fed thereto through the interface circuit 4a from various sensors including vertical G sensors $1_{FL}$, $1_{FR}$ and $1_{RR}$, and a lateral G sensor 2. The vertical G sensors $1_{FL}$, $1_{FR}$ and $1_{RR}$ are mounted on the vehicle body (sprung mass) near tho positions (referred hereinafter as road wheel positions) at which the respective shock absorbers $Sa_{FL}$, $SA_{FR}$ and $SA_{RR}$ are attached to the vehicle body, as shown in FIG. 2. The vertical G sensors $1_{FL}$, $1_{FR}$ and $1_{RR}$ sense the vertical accelerations of the vehicle body (sprung mass) at the respective road wheel positions and produce sensor signals indicative of the sensed vertical accelerations $G_{FL}$, $G_{FR}$ and $G_{RR}$ to the interface circuit 4a. Each of the sensed vertical accelerations $G_{FL}$, $G_{FR}$ and $G_{RR}$ has a positive sign when it is directed upward and a negative sign when it is directed downward. The lateral G sensor 2 is mounted on the vehicle body at a position intermediate the front road wheels. The lateral G sensor 2 senses the lateral acceleration of the vehicle body and produces a sensor signal indicative of the sensed lateral acceleration $G_S$. The sensed lateral acceleration $G_S$ has a positive sign when it is directed from the left road wheel to the right road wheel and a negative sign when it is directed prom the right road wheel to the left road wheel. The central processing unit 4b transfers the control word specifying the calculated damping coefficient to the drive circuit 4c for producing a control signal V to drive a corresponding one of the step motors 3 to provide the calculated damping force characteristic.

Figure 3:
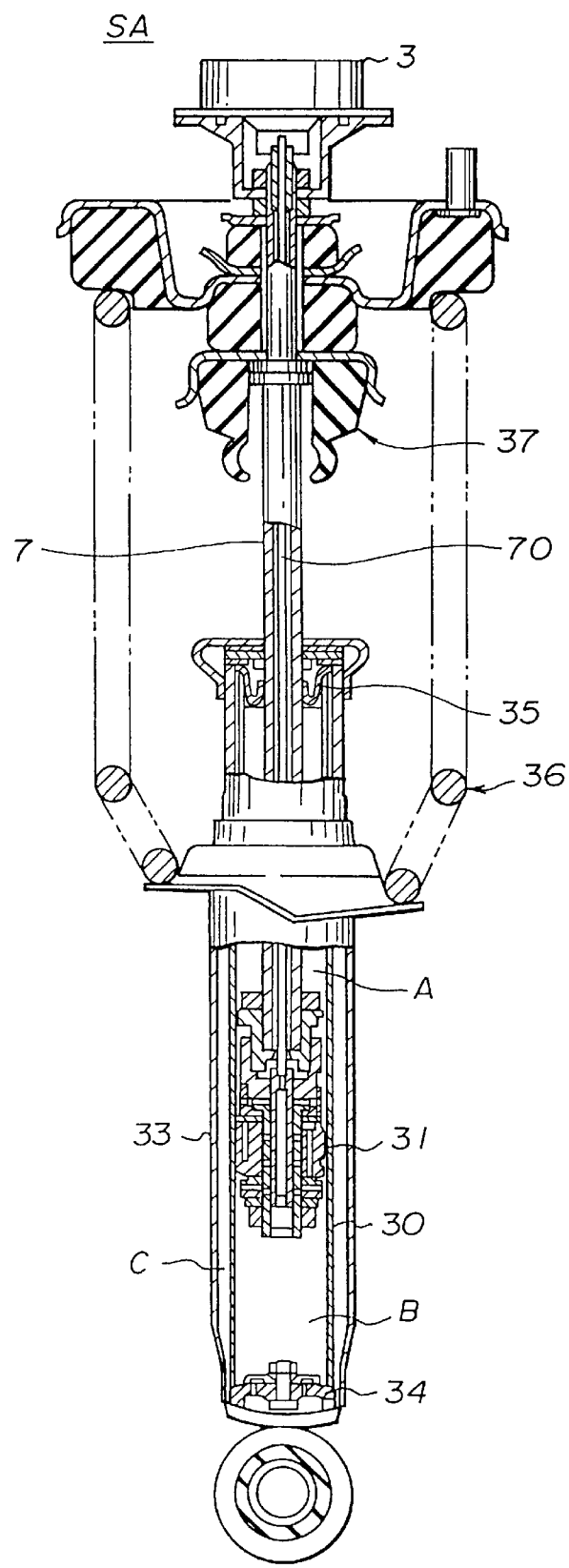
FIG. 3 is a sectional view showing the detailed structure of each of the shock absorbers.

Referring to FIG. 3, there is shown a variable damping force type shock absorber which may be used with the suspension control apparatus. The shock absorber SA includes a cylinder 30 and a piston 31 mounted for reciprocal motion within the cylinder 30. The piston 31 defines upper and lower chambers A and B on the opposite sides thereof. An outer envelop 33 is placed to surround the cylinder 30 so as to define a reservoir C along therewith. A base 34 is provided to separate the reservoir C from the lower chamber B. A piston rod 7 is coupled to the piston 31 for sliding movement. The sliding movement of the piston rod 7 is guided by a guide member 35. A suspension spring 36 is seated between the outer envelop 33 and the vehicle body. The numeral 37 designates a bumper rubber member (or bushing).

Figure 4:
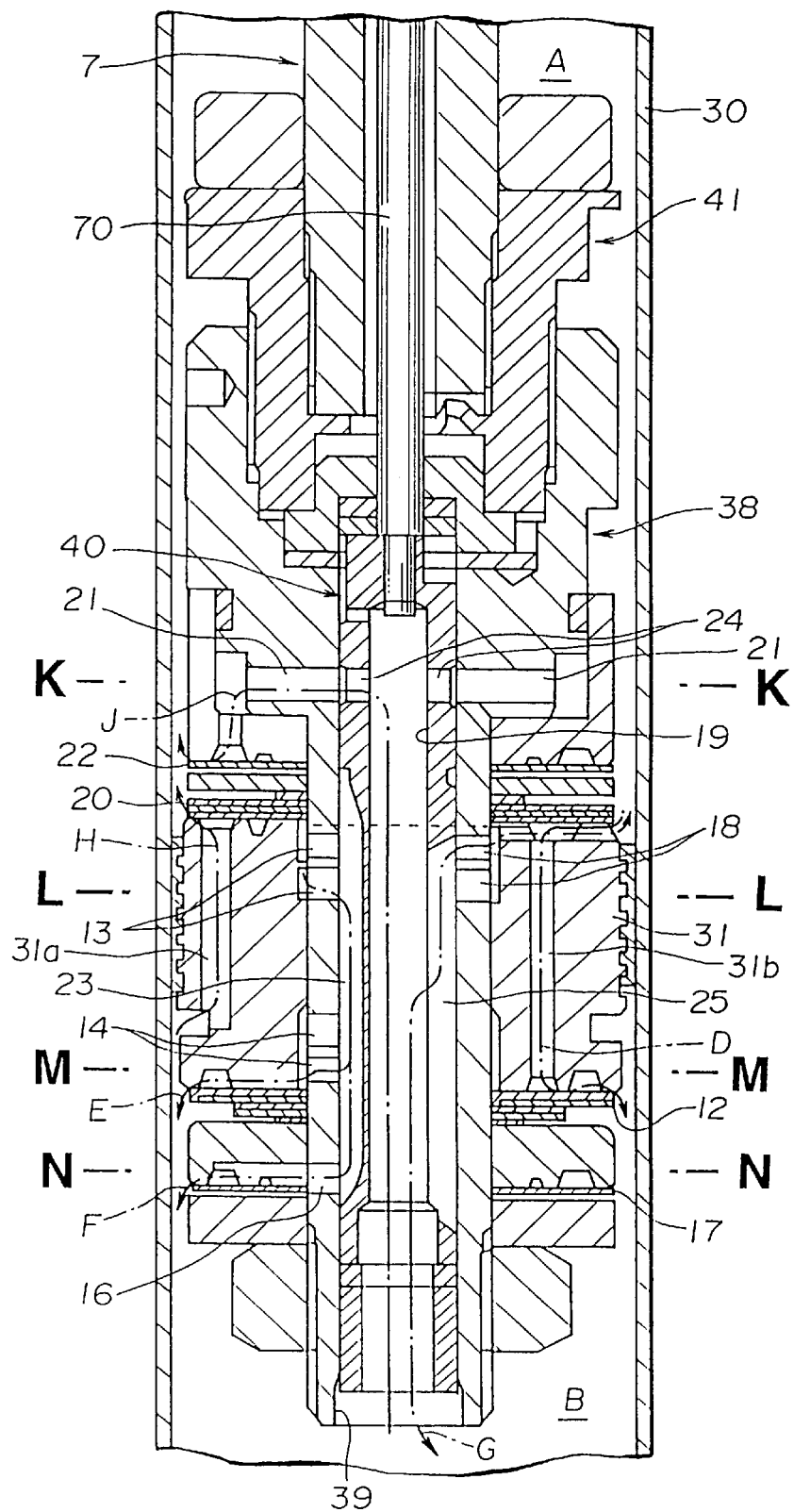
FIG. 4 is a fragmentary enlarged sectional view showing the significant portion of the shock absorber.

Referring to FIG. 4, the piston 31 has first and second passages 31a and 31b extending over the full length of the piston 31. A compression side damping valve is provided in cooperation with the first passage 31a. An extension side damping valve 12 is provided in cooperation with the second passage 31b. the piston rod 7 is threadedly engaged at its tip end with a bound stopper 41. The bound stopper 41 is threadedly engaged within a stud 38 extending through the piston 31. The stud 38 is formed with a flow passage 39 bypassing the first and second passages 31a and 31b to form a passage (passages E, F, G and J) connected between the upper and lower chambers A and B. Provided in cooperation of the flow passage 39 are an adjuster 40, an extension side check valve 17 and a compression side check valve 22. The adjuster 40 is drivingly associated with the corresponding one of the pulse motors 3 which rotates the a[]duster through a control rod 70 (FIG. 3) to adjust the effective area of the flow passage 39. The stud 38 is formed with first, second, third, fourth and fifth ports 21, 12, 18, 14 and 16 in a descending scale. The adjuster 40 has a hollow portion 19, first and second lateral holes 24 and 25, and a longitudinal groove 23 formed in its outer peripheral surface. In this structure, thus, four flow passages are formed for connection between the upper and lower chambers A and B during extension stroke (or phase). These flow passages include an extension side first flow passage D extending from the second passage 31b through the inner side of the extension side damping valve 12 to the lower chamber B, an extension side second flow passage E extending from the second port 13 through the Longitudinal groove 23 to the fourth port 14 and hence through the outer peripheral side of the extension side damping valve 12 to the lower chamber B, an extension side third flow passage P extending from the second port through the longitudinal groove 23 to the fifth port 16 and hence through the extension side check valve 17 to the lower chamber B, and a bypass passage G extending from the third port 18 through the second lateral hole 25 and the hollow portion 19 to the lower chamber B. Furthermore, three flow passages are formed for connection between the upper and lower chambers A and B during compression stroke. These flow passages include a compression side first flow passage H extending from the first passage 31a through the compression side damping valve 20, a compression side second flow passage J extending from the hollow portion 19 through the first lateral hole 24 to the first port 21 and hence through the compression side check valve 22 to the upper chamber A, and a bypass passage G extending from the hollow portion 19 through the second lateral hole 25 and the third port 1, to the upper chamber A.

Figure 5:
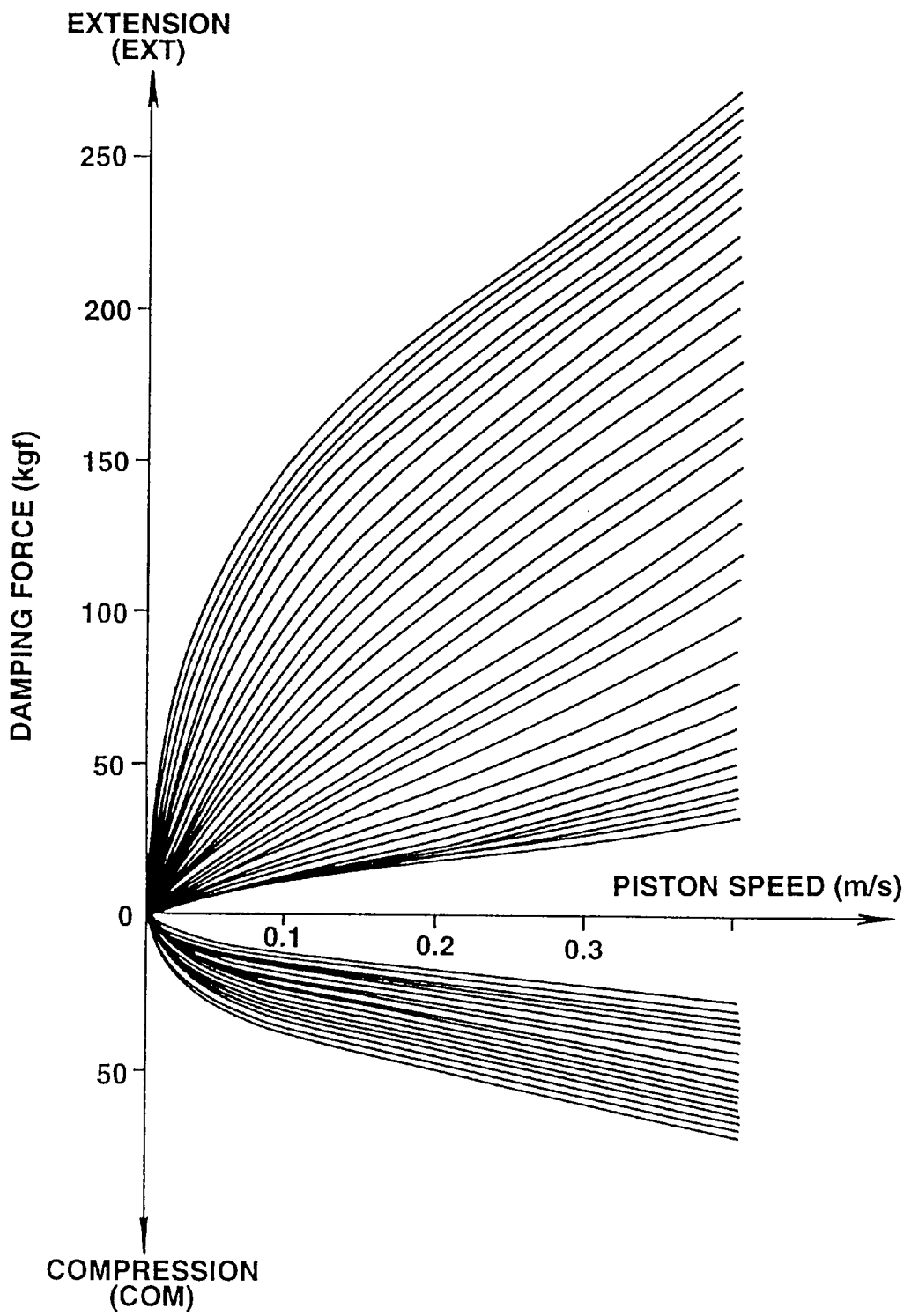
FIG. 5 is a graph of damping force versus piston speed.
Figure 6:
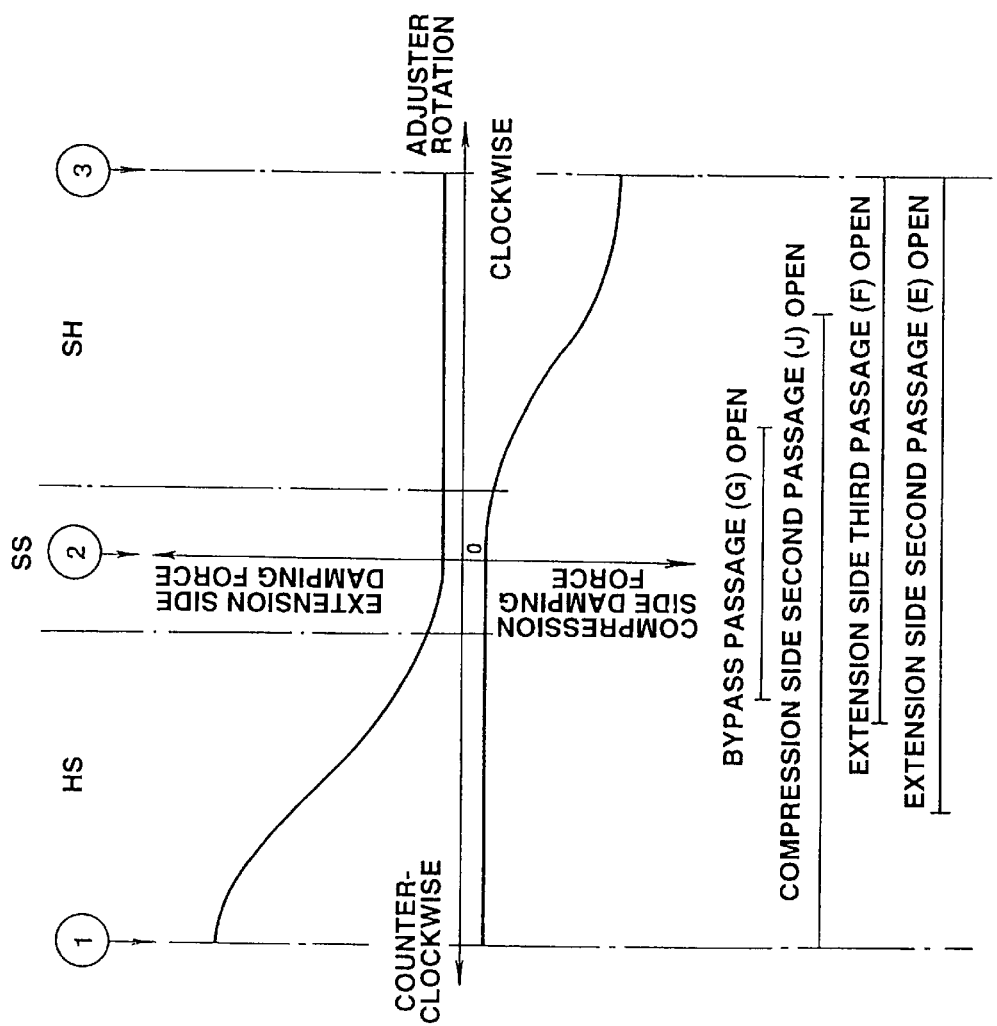
FIG. 6 is a diagram used in explaining the control ranges in which the shock absorber is operable with rotation of the adjuster placed in the shock absorber.
Figure 7A:
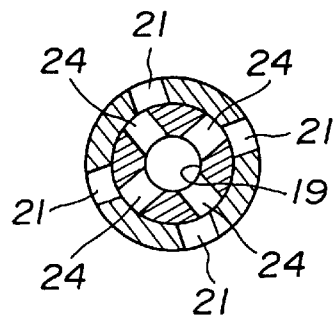
FIG. 7A is a cross-sectional view taken along the line K—K of FIG. 4 in the first position of the adjuster.
Figure 7B:
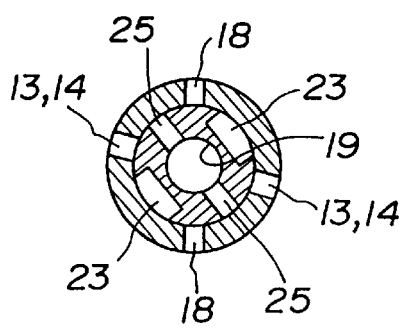
FIG. 7B is a cross-sectional view taken along the lines L—L and M—M of FIG. 4 in the first position of the adjuster.
Figure 7C:
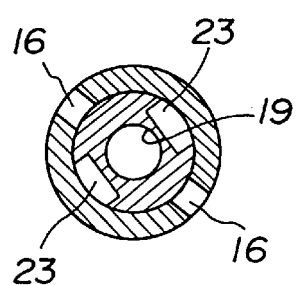
FIG. 7C is a cross sectional view taken along the line N—N of FIG. 4 in the first position of the adjuster.
Figure 8A:
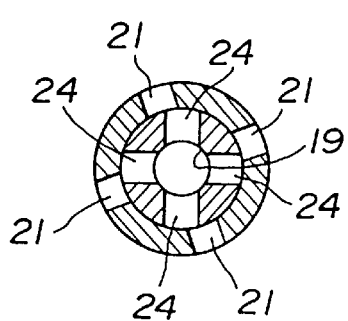
FIG. 8A is a cross-sectional view taken along the line K—K of FIG. 4 in the second position of the adjuster.
Figure 8B:
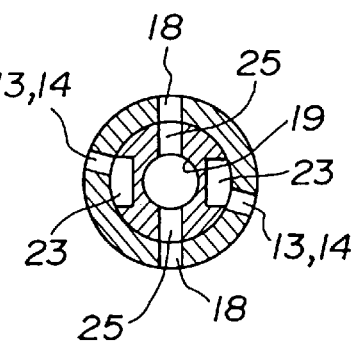
FIG. 8B is a cross-sectional view taken along the lines L—L and M—M of FIG. 4 in the second position of the adjuster.
Figure 8C:
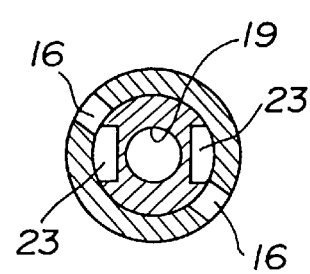
FIG. 8C is a cross-sectional view taken along the line N—N of FIG. 4 in the second position of the adjuster.
Figure 9A:
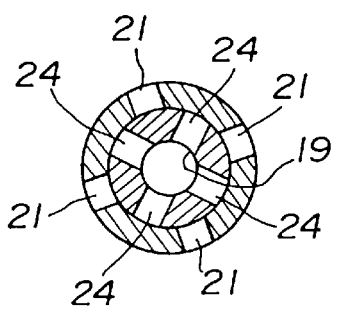
FIG. 9A is a cross-sectional view taken along the line K—K of FIG. 4 in the third position of the adjuster.
Figure 9B:
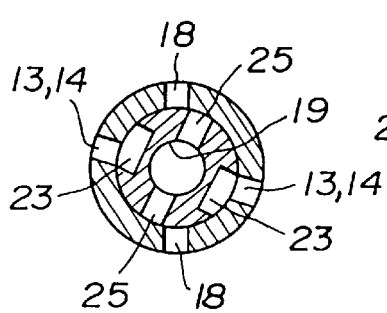
FIG. 9B is a cross-sectional view taken along the lines L—L and M—M of FIG. 4 in the third position of the adjuster.
Figure 9C:
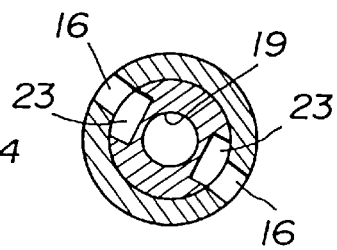
FIG. 9C is a cross-sectional view taken along the line N—N of FIG. 4 in the third position of the adjuster.
Figure 10:
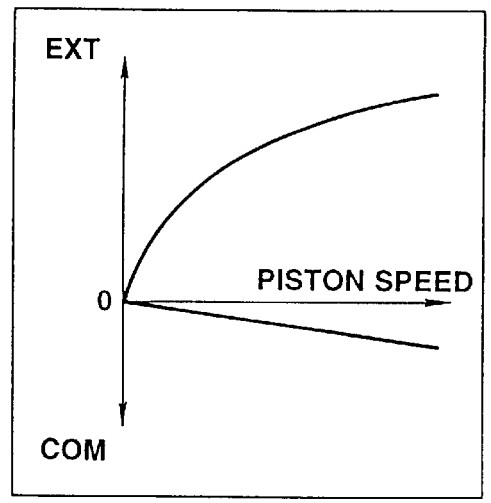
FIG. 10 is a diagram used in explaining the damping force characteristic in the first position of the adjuster.
Figure 11:
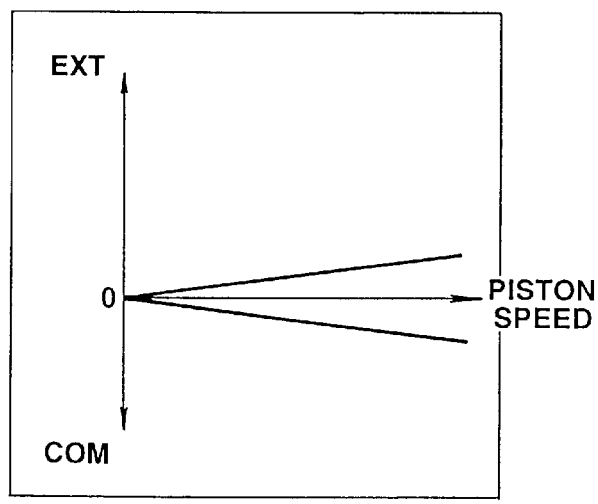
FIG. 11 is a diagram used in explaining the damping force characteristic in the second position of the adjuster.
Figure 12:
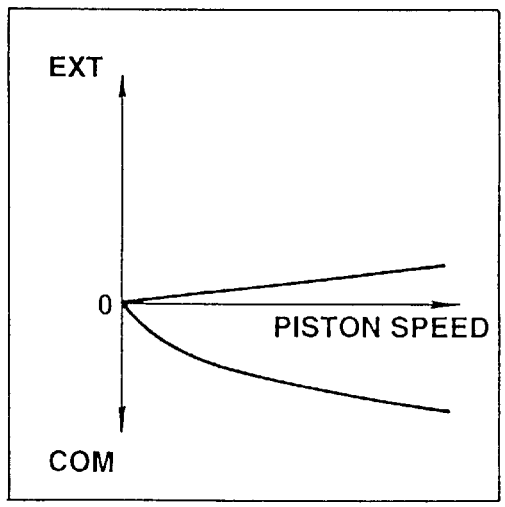
FIG. 12 is a diagram used in explaining the damping force characteristic in the third position of the adjuster.

The adjuster 40 can be rotated to adjust the damping force characteristics of the shock absorber SA in a plurality of steps on both of the extension and compression sides, as shown an FIG. 5. It is now assumed that the adjuster 40 is at a second position ② corresponding to a soft range SS. as shown in FIG. 6, where the shock absorber SA has a soft damping force characteristic on both of the extension and compression sides thereof. This damping force characteristic is shown in FIG. 11. In the second position ②, the components of the piston 31 are positioned as shown in FIGS. 8A, 8B and 8C. FIG. 8A is a cross-sectional view taken along the line K—K of FIG. 4, FIG. 8B is a cross-sectional view taken along the lines L—L and M—M of FIG. 4, and FIG. 8C is a cross sectional view taken along the line N—N of FIG. 4. When the adjuster 40 rotates in a counterclockwise direction from the second position ②, the damping force characteristic of the shock absorber SA changes toward its hard characteristic side in a plurality of steps only on the extension side thereof. Eventually, the adjuster 40 comes to a first position ① corresponding to an extension side hard range HS, as shown in FIG. 6, where the shock absorber SA has a fixed soft characteristic on the compression side thereof. This damping force characteristic is shown in FIG. 10. In the first position ①, the components of the piston 31 are positioned as shown in FIGS. 7A, 7B and 7C. FIG. 7A is a cross-sectional view taken along the line K—K of FIG. 4, FIG. 7B is a cross-sectional view taken along the lines L—L and M—M of FIG. 4, an, FIG. 7C is a cross-sectional view taken along the Line N—N of FIG. 4. When the adjuster 40 rotates in the clockwise direction from the second position ②, the damping force characteristic of the shock absorber SA changes toward its hard characteristic side in a plurality of steps only on the compression side thereof. Eventually, the adjuster 40 comes to a third position ③ corresponding to a compression side hard range SH, as sown in FIG. 6, where the shock absorber SA has a fixed soft characteristic on the extension side thereof. This damping force characteristic is shown in FIG. 12. In the third position ③, the components of the piston 31 are positioned as shown In FIGS. 9A, 9B and 9C. FIG. 9A is a cross-sectional view taken along the line K—K of FIG. 4, FIG. 9B is a cross-sectional view taken along the lines L—L and M—M of FIG. 4, and FIG. 9C is a cross-sectional view taken along the line N—N of FIG. 4.

Figure 13:
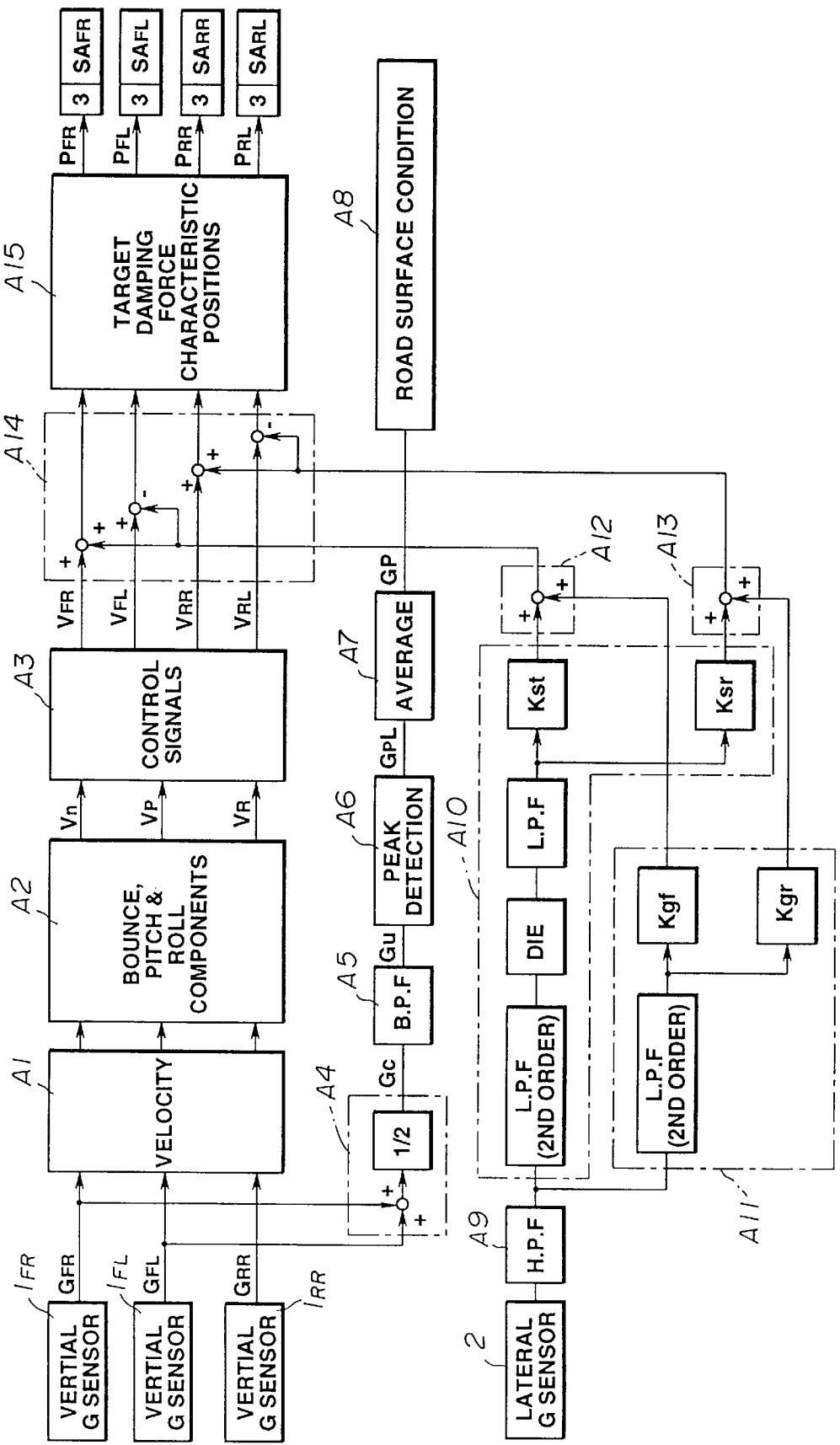
FIG. 13 is a block diagram showing a signal processing circuit used in the suspension control apparatus of FIG. 1.

Referring to FIG. 13, there is shown a signal processing circuit included in the control unit 4 for producing the control signals V to drive the respective pulse motors 3 for damping force characteristic control. This signal processing circuit includes thirteen blocks A1 to A15, The first block A1 receives sensor signals indicative of the sensed vertical accelerations $G_{FL}$, $G_{FR}$, and $G_{RR}$ fed thereto from the front-left, front-right and rear-right vertical G sensors $1_{FL}$, $1_{FR}$ and $1_{RR}$ and it converts them into corresponding sprung mass velocities $Vn_{FL}$, $Vn_{FR}$ and $Vn_{RR}$. For this purpose, the block A1 includes high pass filters HPF for integrating the sensed vertical accelerations $G_{FL}$, $G_{FR}$ and $G_{RR}$, and high and low pass filters LPF and HPF arranged to constitute band pass filters for cutting the frequencies except for the sprung mass resonance frequency band. The block A2 extacts bounce, pitch and roll components from the signals indicative of the sprung mass vertical velocities $Vn_{FL}$, $Vn_{FR}$, $Vn_{RR}$ and $Vn_{RF}$. The sprung mass vertical acceleration $Vn_{RL}$ at the rear-left road wheel position is obtained through calculations. The bounce components at the front-right, front-left, rear-right and rear-light road wheel positions are given as the respective sprung mass vertical velocities $Vn_{FR}$, $Vn_{FL}$, $Vn_{RR}$ and $Vn_{RL}$. The pitch component $V_F$ is given, from Equation (1), as the difference of the sprung mass vertical velocity $Vn_{RR}$ at the rear-right road wheel position from the sprung mass vertical velocity $Vn_{FR}$ at the front-right road wheel position. The pitch component $V_F$ has a positive sign when the vehicle squats and a negative sign when the vehicle dives. The roll component $V_R$ is given, from Equation (2), as the difference of the sprung mass vertical velocity $Vn_{FL}$ at the front-left road wheel position from the sprung mass vertical velocity $Vn_{FR}$ at the front-right road wheel position. The roll component $V_R$ has a positive sign when the vehicle inclines to the left and a negative sign when the vehicle inclines to the right.

$$V_P = Vn_{FR} - Vn_{RR} \quad (1)$$

$$V_R = Vn_{FR} - Vn_{FL} \quad (2)$$

The block A3 produces control signals V ($V_{FR}$, $V_{FL}$, $V_{RR}$ and $V_{RL}$) for controlling the respective shock absorbers provided for the front-right, front-left, rear-right and rear-light road wheels to have target damping force characteristics in a normal node, for example, when the vehicle is running in a straight line on a good surface road, from the following equations:

$$V_{FR} = \alpha_f(Vn_{FR} + \beta_f \cdot V_F + r_f V_R) \quad (3)$$

$$V_{FL} = \alpha_f(Vn_{FL} + \beta_f V_P + r_f V_R) \quad (4)$$

$$V_{RR} = \alpha_r(Vn_{RR} + \beta_r \cdot V_F + r_r \cdot V_R) \quad (5)$$

$$V_{RL} = \alpha_f(Vn_{RL} + \beta_r \cdot V_P + r_r \cdot V_R) \quad (6)$$

where $\alpha_f$, $\beta_f$ and $r_f$ are gains for the front road wheels, and $\alpha_r$, $\beta_r$ and $r_f$ are gains for the rear road wheels.

The block A4 receives the sensor signals indicative of the vertical accelerations $G_{FL}$ and $G_{FR}$ fed thereto from the front-left and -right vertical G sensors $1_{FL}$ and $1_{FR}$ and it averages the vertical accelerations $G_{FL}$ and $G_{FR}$ to derive a sprung mass vertical acceleration $G_R$ at a position intermediate the front road wheels from the following equation:

$$G_C = (G_{FR} + G_{FL})/2 \quad (7)$$

Figure 14:
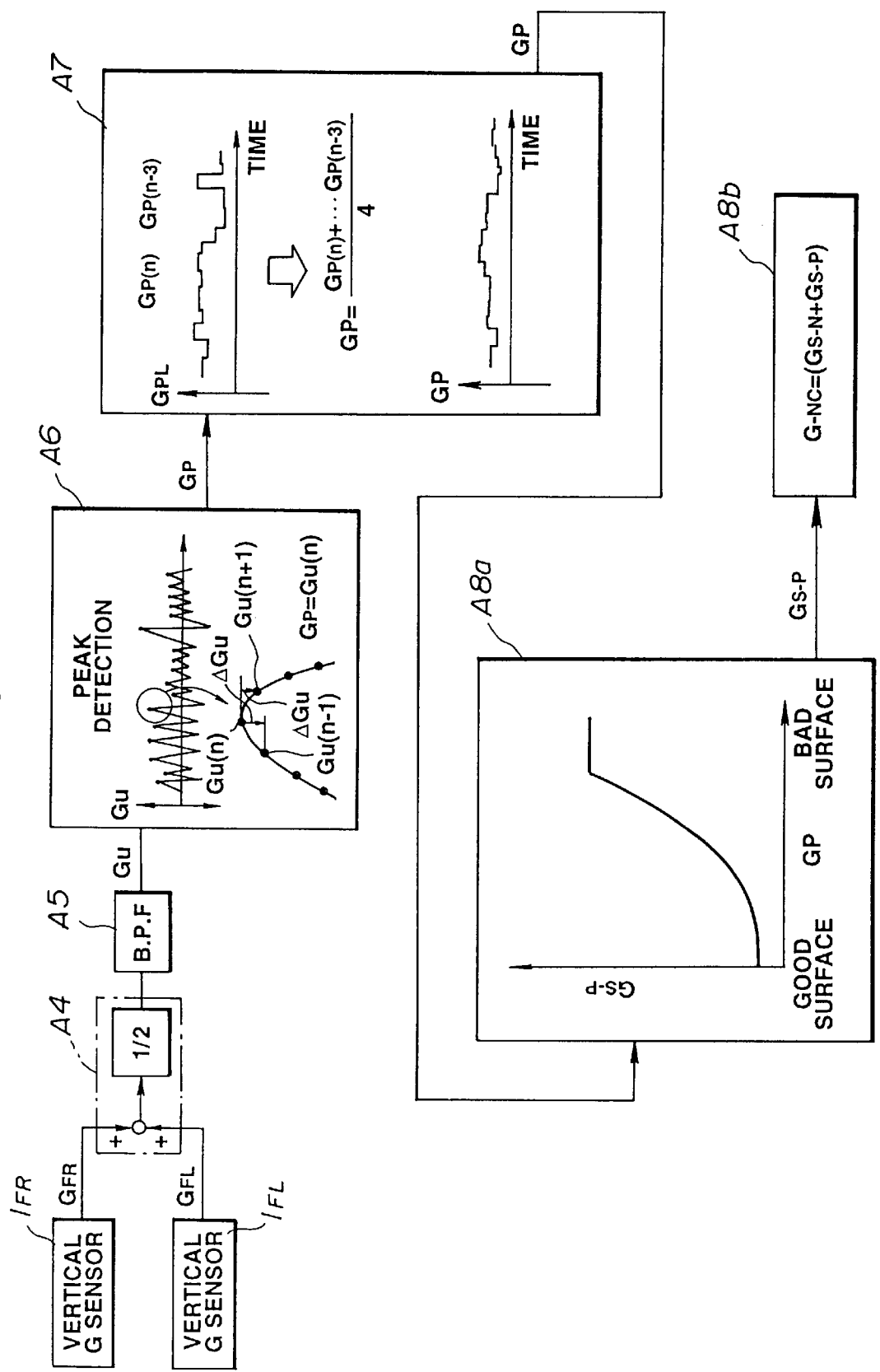
FIG. 14 is a block diagram showing a significant portion of the signal processing circuit.

The block A5 includes a band pass filter BPF for extracting the unsprung mass resonance frequency component $G_U$ from the sprung mass vertical acceleration $G_C$. The unsprung mass resonance frequency component $G_U$ is used for a determination as to the road surface condition. The block A6 receives the extracted unsprung mass resonance frequency component $G_U$ and detects a peak value $G_P(n)$ of the unsprung mass resonance frequency component $G_U$ The block A6 produces a low frequency signal $G_{PL}$ indicative of the detected peak value $G_P(n)$ which is held until the next peak value $G_P(n+1)$ is detected. The block A6 may be arranged to sample the extracted unsprung mass resonance frequency component $G_U$ and calculates a difference $\Delta G_U$ ($= G_U(n) - G_U(n-1)$) between the new and last values of the extracted unsprung mass resonance frequency component $G_U$. These operations are repeated at uniform intervals of time. The block A6 detects the peak value $G_P(n)$ when the calculated difference changes from a positive value to a negative value, as best shown in FIG. 14. The block A7 receives the low frequency signal $G_{PL}$ and averages it through moving average to produce a smooth road surface condition decision signal GP without sudden changes, for example, as GP=($G_P(n)+G_P(n-1) \ldots G_P(n-3)$)/4, as best shown in FIG. 14. The road surface condition decision signal GP has a greater value for a worse road surface condition. The block A8 makes a determination as to whether the vehicle is running on a bad or good surface road. For this determination, the block A8 calculates a value $G_{S-P}$ from a relationship programmed into the computer. This relationship specifies this value $G_{S-P}$ as a function of road surface condition decision signal GP, as shown in FIG. 14. The block A8 also calculating a threshold value $G_{-NC}$ ($=G_{S-N}+G_{S-P}$) by adding the calculated value $G_{S-P}$ to a fixed value $G_{S-N}$, as best shown in FIG. 14. It is to be understood that the block B8 may be arranged to calculate the threshold value $G_{-NC}$ ($=G_{S-N} \times G_{S-P}$) by multiplying the calculated value $G_{S-P}$ by the fixed value $G_{S-N}$.

The block A9 includes a high pass filter HPF which receives the lateral G signal $G_Y$ fed from the lateral G sensor 2 and eliminates signal drifts produced in the presence of vertical and longitudinal low frequency component$ resulting from errors introduced when the lateral G sensor 2 is mounted, The filtered signal is fed from the block A9 to the block A10 and also to the block A11. The block A10 is arranged to produce roll rate signals GV-$_F$ and GV-R for the front and rear road wheels by passing the filtered signal fed from the block A9 through a second-order low pass filter (LPF) to produce a signal similar to a vehicle roll signal, differentiating this signal to produce a roll rate signal, passing this roll rate signal GV through a first-order low pass filter LPF to eliminate the high frequency noise introduced during the differentiating process and multiplying the roll rate gains K$_{3f}$ and K$_{3r}$ by the roll rate signal GV. The block A11 is arranged to produce roll signals GR-$_F$ and GR-$_R$ for the front and rear road wheels by passing the filtered signal fed from the block A9 through a second-order low pass filter LPF to produce a vehicle roll signal GR and multiplying the roll rate gains K$_{gf}$ and K$_{gr}$ by the roll rate signal GR. The block A12 produces a front road wheel side correction signal V$_{S-F}$ by adding the front road wheel side roll rate signal GV-$_F$ to the front road wheel side roll signal GR-$_F$. The block A13 produces a rear road wheel side correction signal V$_{S-R}$ by adding the rear road wheel side roll rate signal GV-$_R$ to the rear road wheel side roll signal GR-$_R$.

The block A14 correct the control signals V fed from the block A3 baded on the correction signals fed thereto from the blocks A12 and A13 to be described later to produce control signals V$_S$ (V$_S$FR, V$_S$FL, V$_S$RR, V$_S$RL) for controlling the respective shock absorbers provided for the front-right, front-left, rear-right and rear-light road wheels to have target damping force characteristics in a correction mode, for example, when the vehicle is turning, from the following equations:

$$V_SFR = VFR + V_{s-f} \tag{8}$$

$$V_SFL = VFL - V_{s-f} \tag{9}$$

$$V_SRR = VRR + V_{s-r} \tag{10}$$

$$V_SRL = VRL - V_{s-r} \tag{11}$$

The block A15 calculates the target damping force characteristic positions P (P$_{FR}$, P$_{FL}$, P$_{RR}$, P$_{RL}$) for the normal mode from the following equations:

$$P_{FR} = VFR \cdot a_f \tag{12}$$

$$P_{FL} = VFL \cdot a_f \tag{13}$$

$$P_{RR} = VRR \cdot a_r \tag{14}$$

$$P_{RL} = VRL \cdot a_r \tag{15}$$

where a$_f$ is the front road wheel side gain and a$_r$ is the rear road wheel side gain. The block A15 also calculates the target damping force characteristic positions P (P$_{FR}$, P$_{FL}$, P$_{RR}$, P$_{RL}$) for the correction mode from the following equations:

$$P_{FR} = V_SFR \cdot b_f \tag{16}$$

$$P_{FL} = V_SFL \cdot b_f \tag{17}$$

$$P_{RR} = V_SRR \cdot b_r \tag{18}$$

$$P_{RL} = V_SRL \cdot b_r \tag{19}$$

where b$_f$ is the front road wheel side gain and b$_r$ is the rear road wheel side gain.

Referring to FIG. 15, the normal mode of operation of the control unit 4 will be described. It is now assumed that the sprung mass vertical velocity Vn changes with time as shown in FIG. 15A. When the sprung mass vertical velocity Vn is zero, the shock absorber SA is controlled to have a damping force characteristic placed in the soft range SS where both of the extension and compression phases exhibit predetermined fixed low damping force characteristics. When the sprung mass vertical velocity Vn has a positive value, the damping force characteristic of the shock absorber is controlled in the extension phase hard range HS where the compression phase is fixed at a predetermined low (soft) damping force characteristic. The extension phase damping force characteristic is changed in direct proportion to the control signal V (VFR, VFL, VRR, VRL), that is, the target damping force characteristic positions P (P$_{FR}$, P$_{FL}$, P$_{RR}$, P$_{RL}$) of the respective shock absorbers SA are calculated from Equations (12) to (15). When the sprung mass vertical velocity Vn has a negative value, the daring force characteristic of the shock absorber SA is controlled in the compression phase hard range SH to provide a predetermined low (soft) damping force characteristic in the extension phase. The compression phase damping force characteristic is changed in direct proportion to the control signal V (VFR, VFL, VRR, VRL), that is, the target damping force characteristic positions P (P$_{FR}$, P$_{FL}$, P$_{RR}$, P$_{RL}$) of the respective shook absorbers SA are calculated from Equations (12) to (25).

In FIG. 15C, the character "a" designates a control range where the sprung mass vertical velocity, Vn changes from its negative sign (downward) to its positive sign (upward). Since the relative velocity between the sprung and unsprung masses remains negative (the shock absorber operates in the compression phase), the shock absorber is controlled in the extension phase hard range HS according to the sign (direction) of the sprung mass vertical velocity Vn. In the control range a, thus, the shock absorber is controlled to provide a soft characteristic n the compression phase.

In the control range b where sign of tire sprung mass vertical velocity Vn remains positive (upward) and the relative velocity changes from its negative sign to its positive sign indicating the extension phase (EXT) of the shock absorber, the shock absorber is controlled in the extension phase hard range HS according to the sign (direction) of the sprung mass vertical velocity Vn and the shock absorber is in the extension phase. In this control range, thus, the shock absorber is controlled to have a hard characteristic in direct proportion to the control signal V in the extension phase corresponding to the present phase of the shock absorber.

In the control range c where the sprung mass vertical velocity Vn changes from its positive sign (upward) to its negative sign (downward) with the relative velocity having a positive sign indicating the extension phase (EXT) of the shock absorber, the shock absorber is controlled in the compression phase hard range SH according to the sign (direction) of the sprung mass vertical velocity Vn. In this control range, thus, the shock absorber is controlled to have a soft characteristic in the extension phase corresponding to the present phase of the shock absorber.

In the control range d where the sign of the sprung mass vertical velocity Vn remains negative (downward) and the relative velocity changes from its positive sign to its negative sign indicating the extension phase (EXT) of the shock absorber, the shock absorber is controlled in the compression phase hard range SH based on the sign (direction) of the sprung mass vertical velocity Vn. In this control range, thus, the shock absorber is controlled to have a hard characteristic directly proportional to the control signal V in the compression phase corresponding to the present phase of the shock absorber.

In this embodiment, the shock absorber is controlled to provide a hard characteristic in the present phase of the shock absorber when the sign of the sprung mass vertical velocity Vn and the sign of the relative velocity are the save (control ranges, b and d) and to provide a soft characteristic in the present phase of the shock absorber when the signs of the sprung mass vertical velocity Vn and the relative velocity are different (control ranges a and c). It is, therefore, possible to perform the same control as the damping force characteristic control made according to the sky hook theory. Furthermore, the damping force characteristic position has been switched to the hard characteristic side in the previous control ranges a and c at the time when the phase of the shock absorber is switched, that is, in response to a change from the control range a to the control range b and also to a change from the control range c to the control range d (from the soft characteristic to the hard characteristic). It is, therefore, possible to make a change from the soft characteristic to the hard characteristic with no delay in time. This is effective to provide a very fast control response.

Figure 16:
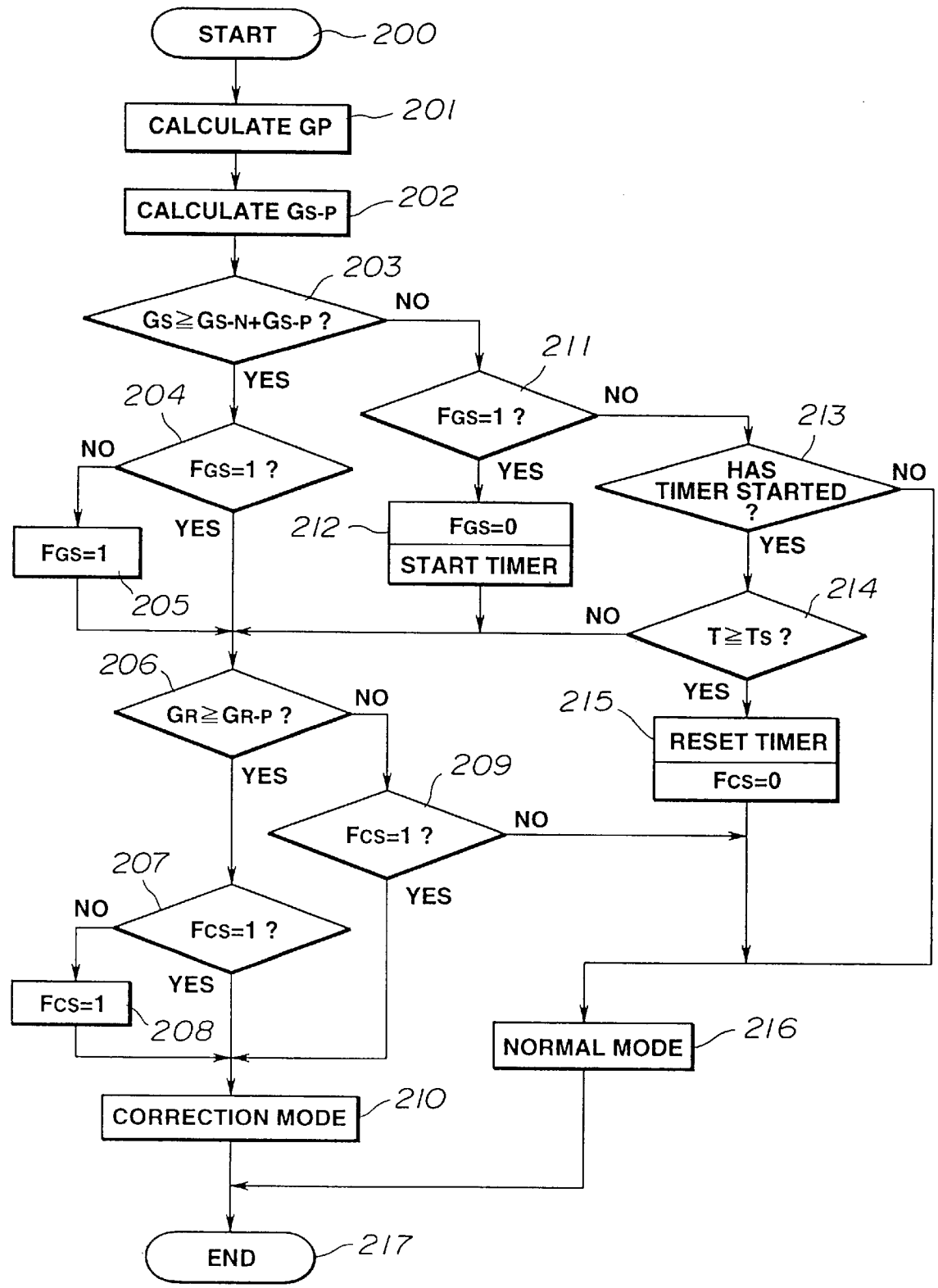
FIG. 16 is a flow diagram used in explaining the operation of the control unit to select one of normal and correction control modes.

FIG. 16 is a flow diagram of the programming of the digital computer as it is use for control mode changes. The computer program is entered at the point 200 at uniform intervals of time. At the point 201 in the program, the road surface condition decision signal $G_P$ is calculated. This step corresponds to the functions off the blocks A4 to A7. At the point 202, the value $G_{S-P}$ is calculated based on the road surface decision signal GP. This step corresponds to the block A8 (A8a, A8b). At the point 203, a determination is made as to whether or not the roll rate component $G_S$ equal to or greater than the threshold value $G_{-NC}$, that is, the sum of the first value $G_{S-P}$ and the fixed value $G_{S-N}$. the answer to this question is "yes", then the program proceeds to another determination step at the point 204. This determination is as to whether or not a lag $F_{GS}$ has been set. If the answer to this question is "yes", then the program proceeds to the point 206. Otherwise, the program proceeds to the point 205 where the flag $F_{GS}$ is set and then to the point 206.

At the point 206 in the program, a determination is made as to whether or not the roll component $G_R$ is equal to or greater than a predetermined threshold value $G_{R-P}$. If the answer to this question is "yes", then the program proceeds to the point 207. Otherwise, the program proceeds to the point 209. At the point 207, a determination is made as to whether or not a flag $F_{CS}$ has been set. If the answer to this question is "yes", then the program proceeds to the point 210. Otherwise, the program proceeds to the point 208 where the flag $F_{CS}$ is set and then to the point 210. At the point 210, the correction mode is selected for stable vehicle steering operation. In this case, the target damping force characteristic positions P of the shock absorbers SA are calculated, from Equations (12) to (15), based on the respective control signals V. Following this, the program proceeds to the end point 217. At the point 209, a determination is made as to whether or not the flag $F_{CS}$ has been set. If the answer to this question is "yes", then the program proceeds to the point 210. Otherwise, the program proceeds to the point 216 where the normal mode is selected for comfortable driving feeling. In this case, the target damping force characteristic positions P of the shock absorbers SA are calculated, from Equations (16) to (19), based on the respective control signals V corrected by the correction signal $V_{s-f}$ or $V_{s-r}$. Following this, the program proceeds to the end point 217.

If the answer to the question inputted au the point 203 is "no", then the program proceeds to another determination step at the point 211. This determination is as to whether or not the flag $F_{GS}$ has been set. If the answer to this question is "yes", then the program proceeds to the point 212 where the flag $F_{GS}$ is cleared and an OFF timer is started and there to the point 206. Otherwise, the program proceeds to the point 273. At the point 213, a determination is made as to whether or not the OFF timer has been started. If the answer to this question is "yes", then the program proceeds to the point 214. Otherwise, the program proceeds to the point 216. At the point 214, a determination is made as to whether or not the count T of the OFF timer is equal to or greater than a predetermined value Ts. If the answer to this question is "yes", then the program proceeds to the point 215. Otherwise, the program proceeds to the point 206. At the point 215, the OFF timer is reset and the flag $F_{CS}$ is cleared. Following this, the program, proceeds to the point 216.

Figure 17:
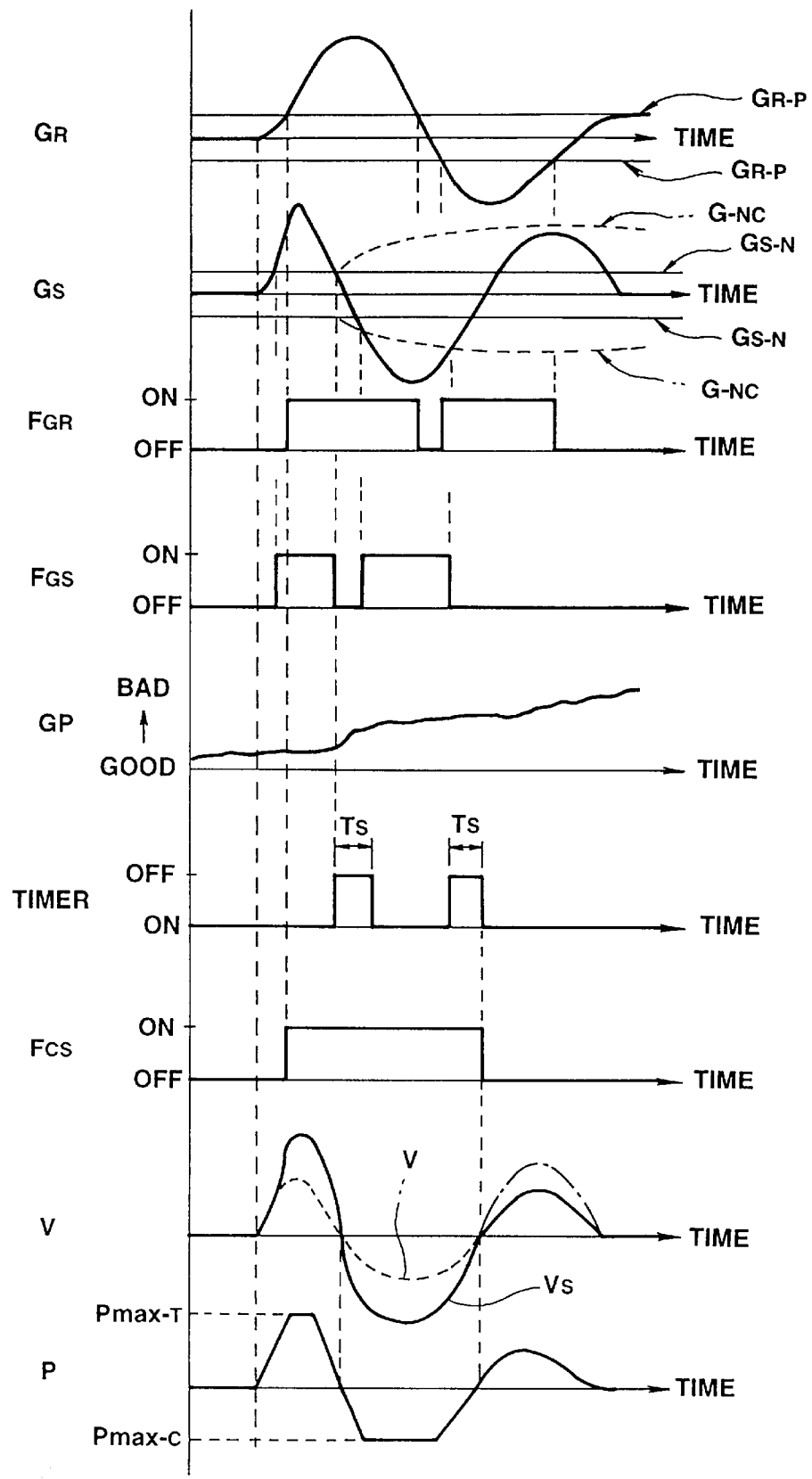
FIG. 17 is a time chart used in explaining the operation of the control unit to control the damping force characteristics of the respective shock absorbers.

Referring to FIG. 17, the operation of the vehicle suspension control apparatus of the invention will be described further. When the vehicle is running on a good surface road, the roll component $G_R$ is less than the fixed value $G_{R-P}$ and the roll rare component $G_S$ is less than the threshold value $G_{-NC}$ (=$G_{S-N}$+$G_{S-P}$). Thus, the control unit operates in the normal mode to control the damping force characteristics of the respective shock absorbers SA with the use of the control signals V calculated based on the bounce components $V_{FL}$, $V_{FR}$, $V_{RL}$, and $V_{RR}$, pitch component $V_P$ and roll component $V_R$ derived from the sprung mass vertical velocity signals Vn. It is, therefore, possible to minimize the vibrations caused in the vehicle behaviors resulting from the combination of the bounce, pitch and roll components so as to ensure comfortable driving feel and good vehicle steering stability.

When a lateral acceleration acts on the vehicle during vehicle steering operation, the roll component $G_R$ exceeds the filed value $G_{R-P}$ and the roll rate component $G_S$ exceeds the threshold value $G_{-NC}$ (=$G_{S-N}$+$G_{S-P}$). Thus, the control unit operates in the correction mode to control the damping force characteristics of the respective shock absorbers SA with the use of the control signals $V_S$. The control signals $V_S$ are obtained by adding the correction signals $V_{s-f}$ and $V_{s-r}$ to or subtracting the correction signals $V_{s-f}$ and $V_{s-r}$ from the control signals V. It is, therefore, possible to provide greater damping force characteristics to minimize the excessive vehicle rolling motion caused by the vehicle steering operation so as to ensure good vehicle steering stability during vehicle steering operation.

When the vehicle is running on a bad surface road, the roll component $G_R$ is less than the value $G_{R-P}$, whereas the roll rate component $G_S$ exceeds the threshold value $G_{-NC}$ (=$G_{S-N}$+$G_{S-P}$) because of an increased lateral acceleration from the road surface inputs. Since the value $G_{S-P}$ to be added to the fixed value $G_{S-N}$ increases when the vehicle is running on a bad surface road, however, the roll rate component $G_S$ will be less than the threshold value $G_{-NC}$ (=$G_{S-N}$+$G_{S-P}$). This is effective to prevent an erroneous change of operation of the control unit to the correction mode. In this case, thus, the normal mode is selected to avoid degraded vehicle driving feeling when the vehicle is running on a bad surface road.

According to the invention, the vehicle suspension control apparatus operates in the normal mode to provide sufficient control effects for the bounce, pitch and roll components so as to ensure comfortable driving feel and good vehicle steering stability when the vehicle is running on a straight line. When the vehicle is cornering, the vehicle suspension control apparatus operates in the correction mode to suppress excessive vehicle rolling motions to a sufficient extent so as to ensure good vehicle steering stability. The vehicle steering condition is detected based on the signals produced from vertical and lateral G sensors 1 and 2 without the use of any steering sensor, This is effective to provide an inexpensive vehicle suspension control apparatus. Since the vehicle suspension control apparatus is arranged to distinguish the roll components resulting from disturbances such as road surface inputs when the vehicle is running or a bad surface road from the roll components resulting from vehicle steering operation, it is possible to ensure comfortable vehicle driving feeling when the vehicle is running in a straight line and good vehicle steering stability during vehicle steering operation. Since the vehicle suspension control apparatus is free from erroneous changes to the correction mode of operation of the control unit which would be made when the vehicle is running on a bad surface road, it is possible to achieve good vehicle steering stability when the vehicle is running on a good surface road and to achieve good vehicle steering stability when the vehicle is running on a bad surface-road. This is effective to improve the vehicle steering stability when the vehicle is running on a good surface road.

Figure 18:
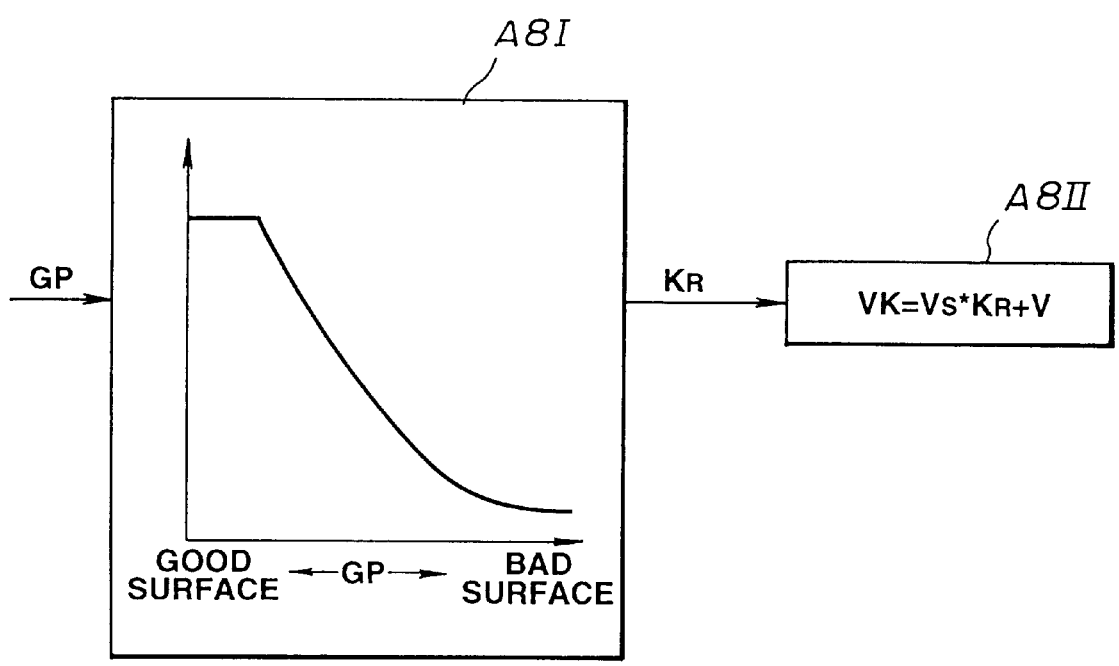
FIG. 18 is a block diagram showing a modified form of the signal processing circuit used in the suspension control apparatus of the invention.
Figure 19:
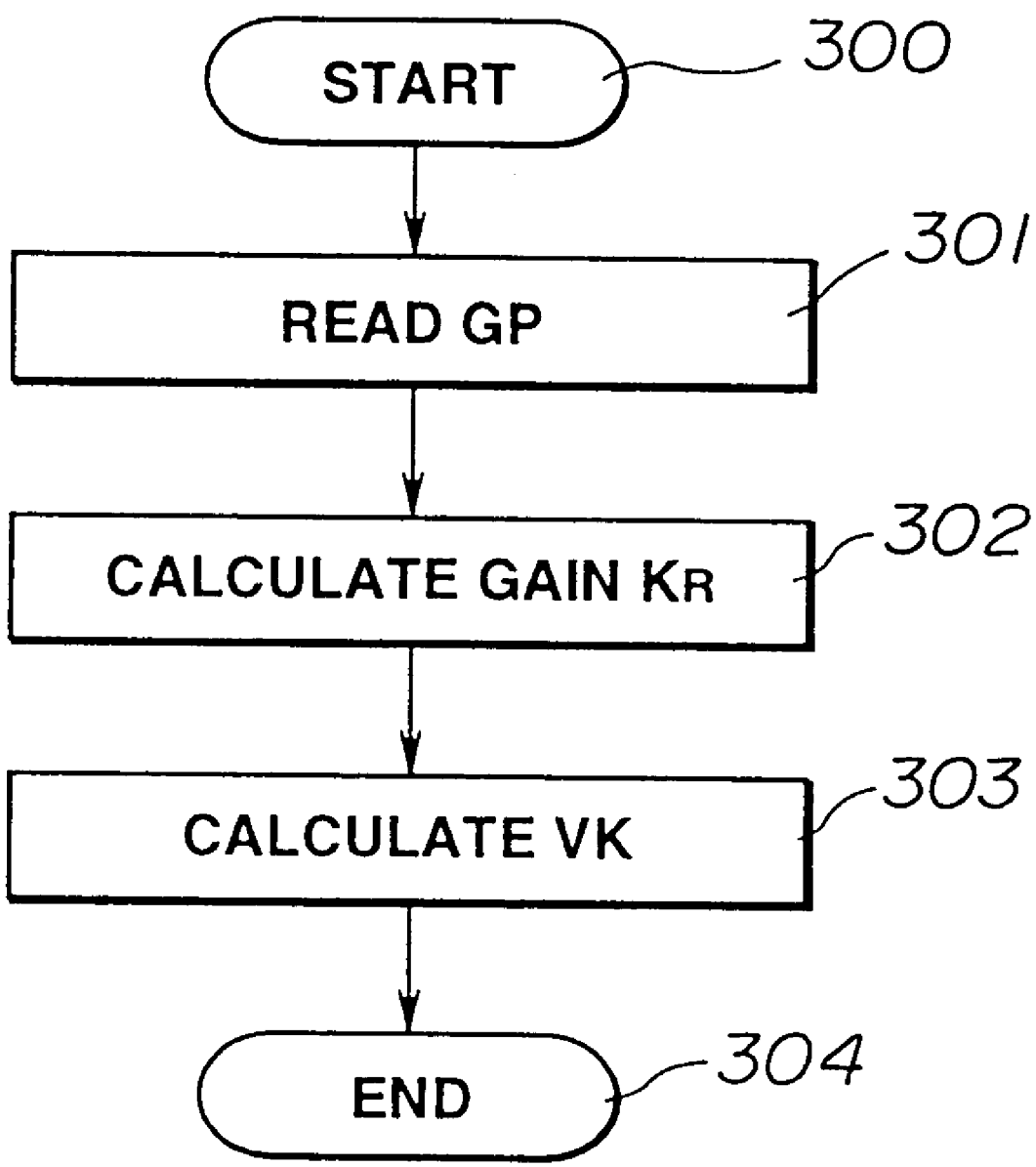
FIG. 19 is a flow diagram used in explaining the operation of the control unit to calculate the target damping force characteristics of the respective shock absorbers.

Referring to FIG. 18, there is shown a modified form of the block A8. In this case, the block A8 calculates a first correction gain $k_R$ from a relationship programmed into the computer. This relationship specifies the first correction gain $k_R$ as a function of road surface condition decision signal GP, as shown in FIG. 18. The block AS also calculating control signals Vk (VkFR, VkFL, VkRR, VkRL) as Vk=$V_S \cdot k_R$+V where V is the control signals calculated in the normal mode. This modification will be described further in connection with FIG. 19 which is a flow diagram of the programming of the digital computer as it is used to calculate the control signals Vk. The computer program is entered at the point 300 at uniform intervals of time. At the point 301 in the program, the road surface condition decision signal GP is read into the computer memory. At the point 302, the correction (control) gain $k_R$ is calculated from the map programmed Into the computer. This map specifies the correction gain $k_R$ as a function of road surface condition decision signal GP. The correction gain $k_R$ decreases as the road surface condition decision signal GP increases, as shown in FIG. 18. At the point 303, the control signals Vk(VkFR, VkFL, VkRR, VkRL) are calculated for common use in the normal and correction modes from the following equations:

$$VkFR = V_S FR \cdot k_R + VFR \quad (20)$$

$$VkFL = V_S FL \cdot k_R + VFL \quad (21)$$

$$VkRR = V_S RR \cdot k_R + VRR \quad (22)$$

$$VkRL = V_S RL \cdot k_R + VRL \quad (23)$$

Following this, the program proceeds to the end point 304.

Figure 20:
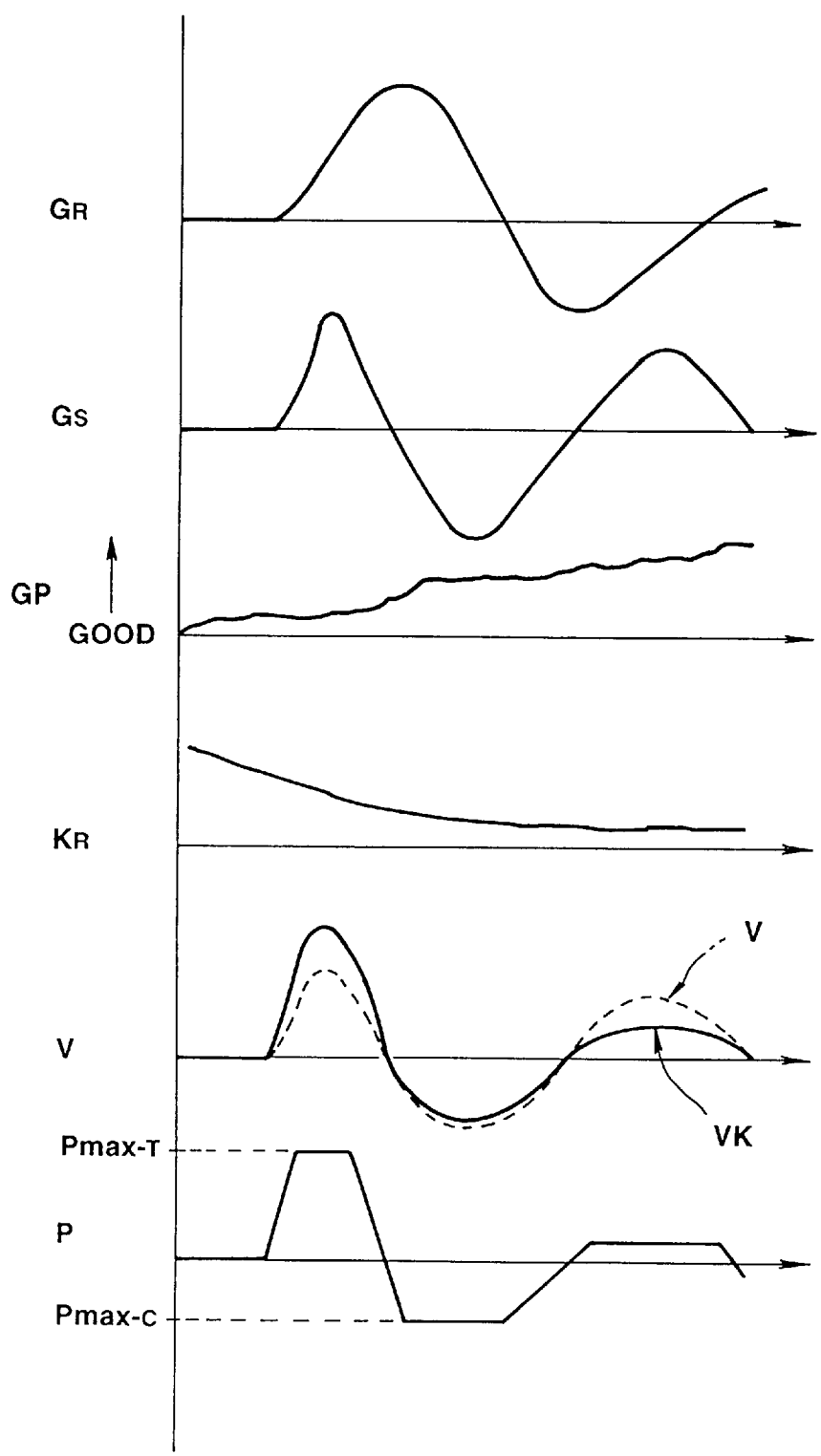
FIG. 20 is a time chart used in explaining the operation off the control unit to control the damping force characteristics of the respective shock absorbers.

Referring to FIG. 20, the operation of the modified form of the vehicle suspension control apparatus of the invention will be described further.

When the vehicle is running on a good surface road, the correction gain $k_R$ is set at a value suitable for the vehicle running in a straight line on a good surface road so as to ensure comfortable vehicle driving feeling.

During vehicle steering operation, the control signals $V_S$ ($V_S$FR, $V_S$FL, $V_S$RR, $V_S$RL) increase and the control signals Vk(VkFR, VkFL, VkRR, VkRL) increases so as to prevent the occurrence of excessive roll.

When the vehicle is running in a straight line on a bad surface road, the control signals $V_S$ ($V_S$FR, $V_S$FL, $V_S$RR, $V_S$RL) increase, whereas the control gain $k_R$ decreases. As a result, the control signals Vk(VkFR, VkFL, VkRR, VkRL) are substantially the same as those calculated when the vehicle is running in a straight line on a good surface road. It is, therefore, possible to avoid degraded vehicle driving feeling when the vehicle is running in a straight line on a bad surface road.

While the invention has been described in connection with three vertical G sensors provided at front-left, front-right and rear-right road wheel positions, it is to be understood that the number and position of the vertical G sensors are not limited to the illustrated case. For example, the invention is applicable with the use of two vertical G sensors provided at the front-left and -right road wheel positions. In this case, the sprung ass vertical accelerations at the rear-left and -right road wheel positions may be determined with the use of appropriate transfer functions. While the invention has been described in connection with the control of the vehicle running on a bad surface road by changing the threshold value or the control gain, it is to be understood that the control may be made by changing the first threshold valve and the control gain. while the invention has been described in connection with a specified embodiment thereof, it is evident that many alternatives, modifications and variations will be apparent to those skilled in the art. Accordingly, it is intended to embrace all alternatives, modifications and variations that fall within the scope of the appended claims.

What is claimed is:

1. A suspension control apparatus for use with an automotive vehicle supported on front-left and -right road wheels at front-left and -right road wheel positions and also on rear-left and -right road wheels at rear-left and -right road wheel positions, comprising:

shock absorbers provided between sprung and unsprung masses of the vehicle at the respective road wheel positions for providing variable damping force characteristics;

first sensor means sensitive to vehicle sprung mass vertical behaviors for producing first sensor signals indicative of the sensed vehicle sprung mass vertical behaviors;

second sensor means sensitive to a vehicle lateral acceleration for producing a second sensor signal indicative of the sensed vehicle lateral acceleration; and a control unit responsive to the first sensor signals for controlling the shock absorbers to have respective target damping force characteristics, the control unit including means fox determining the target damping force characteristics based on the sensed vehicle sprung mass vertical behaviors, means for determining a surface condition of a road on which the vehicle is running based on the first sensor signals, means for comparing the second sensor signal with a reference value, means for detecting vehicle steering operation in response to a result of comparison of the second sensor signal with the reference value, means for determining the target damping force characteristics for vehicle steering operation upon the detection of the vehicle steering operation, and means for correcting the reference value based on the determined surface condition.

2. The suspension control apparatus as claimed in claim 1, wherein the first sensor means includes acceleration sensors positioned for sensing vertical accelerations at the front-left and -right road wheel positions to produce the first sensor signals indicative of the sensed vertical accelerations, and wherein the control unit includes means for averaging the first sensor signals to produce an averaged sensor signal, and means for determining the surface condition based on the averaged sensor signal.

3. The suspension control apparatus as claimed in claim 2, wherein the control unit includes means for sampling peak values of the averaged sensor signal at uniform intervals of time, means for averaging the sampled peak values, and means for determining the surface condition based on the averaged peak values.

4. The suspension control apparatus as claimed in claim 1, wherein the control unit includes means for converting the first sensor signals into a corresponding surface condition of a road on which the vehicle is running, means for converting the second sensor signal into a corresponding vehicle steering condition, means for detecting the vehicle steering operation when the vehicle steering condition exceeds the reference, means for increasing the reference value for a worse road surface condition.

5. The suspension control apparatus as claimed in claim 4, wherein the first sensor-means includes acceleration sensors positioned for sensing vertical accelerations at the front-left and -right road wheel positions to produce the first sensor signals indicative of the sensed vertical accelerations, and wherein the control unit includes means for averaging the first sensor signals to produce an averaged sensor signal, and means for determining the reference value based on the averaged sensor signal.

6. The suspension control apparatus as claimed in claim 5, wherein the control unit includes means for adding a predetermined value to a value increasing as the averaged sensor signal increases to determine the reference value.

7. The suspension control apparatus as claimed in claim 5, wherein the control unit includes means for sampling peak values of the averaged sensor signal at uniform intervals of time,, means for averaging the sampled peak values to produce an averaged peak value signal, and means for adding a predetermined value to a value increasing as the averaged peak value signal increases to determine the reference value.

8. The suspension control apparatus as claimed in claim 1, wherein the control unit includes means using a control gain for determining each of the target damping force characteristics, means for converting the first sensor signals into a corresponding surface condition of a road on which the vehicle is running, and means for decreasing the control gain for a worse road surface condition.

* * * * *